United States Patent
Yamanouchi et al.

(10) Patent No.: US 6,683,900 B2
(45) Date of Patent: Jan. 27, 2004

(54) SOLID STATE LASER APPARATUS

(75) Inventors: Yoshihisa Yamanouchi, Kawasaki (JP); Fumio Matsuzaka, Tokyo-To (JP); Akihiro Nishimi, Yokohama (JP); Minoru Uehara, Tokyo-To (JP); Shinya Nakajima, Kanagawa-Ken (JP); Koichi Mori, Soka (JP)

(73) Assignees: Ishikawajima-Harima Jukogyo Kabushiki Kaisha, Tokyo-to (JP); IHI Scube Co., Ltd., Tokyo-to (JP)

(*) Notice: Subject to any disclaimer, the term of this patent is extended or adjusted under 35 U.S.C. 154(b) by 0 days.

(21) Appl. No.: 09/892,643

(22) Filed: Jun. 28, 2001

(65) Prior Publication Data

US 2002/0118719 A1 Aug. 29, 2002

(30) Foreign Application Priority Data

Feb. 27, 2001 (JP) ........................ 2001-052209

(51) Int. Cl.$^7$ ............... H01S 3/04; H01S 3/091; H01S 3/09; H01S 3/08
(52) U.S. Cl. .................. 372/75; 372/35; 372/98; 372/90; 372/70
(58) Field of Search .................. 372/35, 98, 92, 372/70, 75

(56) References Cited

U.S. PATENT DOCUMENTS

| | | |
|---|---|---|
| 3,361,989 A | 1/1968 | Sirons |
| 3,493,888 A | 2/1970 | Jackson |
| 3,889,207 A | 6/1975 | Burgwald et al. |
| 4,723,257 A | 2/1988 | Baer et al. |
| 5,790,575 A * | 8/1998 | Zamel et al. ............ 372/35 |
| 6,151,341 A * | 11/2000 | Bull et al. ............ 372/35 |
| 6,331,994 B1 * | 12/2001 | Ohmi et al. ............ 372/82 |

FOREIGN PATENT DOCUMENTS

| | | |
|---|---|---|
| GB | 2 089 560 | 6/1982 |
| GB | 2 228 361 | 8/1990 |
| JP | 8-32145 | 2/1996 |
| JP | 11-87806 | 3/1999 |

* cited by examiner

*Primary Examiner*—Eddie Lee
*Assistant Examiner*—Joseph Nguyen
(74) *Attorney, Agent, or Firm*—Oblon, Spivak, McClelland, Maier & Neustadt, P.C.

(57) ABSTRACT

A cavity has a longitudinal hollow having opposite open ends. An excitation source, such as a YAG rod, is accommodated in the hollow of the cavity. A hollow, cylindrical rod holder is inserted into each of the opposite open ends of the hollow and is fitted over a corresponding end of the YAG rod. A seal is fitted into a hollow of the rod holder adjacent to a portion of the rod holder fitted over the end of the YAG rod. The seal includes an annular seal body with a U-shaped section, e.g. made from Teflon®, and fitted over an outer periphery of the YAG rod to grip the YAG rod, as well as a spring fitted in a groove of the seal body provided by the U-shaped section so as to circumferentially surround a gripped portion of the YAG rod.

12 Claims, 3 Drawing Sheets

SOLID STATE LASER APPARATUS

CROSS-REFERENCE TO RELATED DOCUMENTS

The present application is based on and claims priority to JP 2001-052209 filed in the Japanese patent office on Feb. 27, 2001, the entire contents of which are hereby incorporated herein by reference.

BACKGROUND OF THE INVENTION

1. Field of the Invention

The present invention relates to a solid state laser apparatus.

2. Discussion of the Background

A solid state laser apparatus irradiates light or a beam of a lamp or semiconductor laser (e.g., laser diode, which is hereafter referred to by "LD"), as an excitation source, to a solid excitation medium, such as a YAG rod, to excite the YAG rod for emission of a laser beam. An example of such a solid state laser apparatus is shown in FIG. 1, which apparatus includes a cavity 1. A YAG rod 2 is concentrically inserted in a glass, or the like, transparent flow tube 3 in the cavity 1. An excitation lamp 4 is used as the excitation source located in the cavity 1 outside of the flow tube 3 so as to laterally sandwich the YAG rod 2. A rod holder 5 holds a corresponding axial end of the YAG rod 2 (only one side of the apparatus is shown in FIG. 1). A light duct 6 is placed outwardly of the rod holder 5 in an axial direction of the YAG rod 2 to extrude from the cavity 1. Thus, the YAG rod 2, rod holder 5, and light duct 6 are axially aligned with one another.

The solid stage laser apparatus further includes a cooling water channel 7 in the flow tube 3 for cooling the YAG rod 2, a cooling water channel 8 in the cavity 1 for cooling the excitation lamp 4, a block 9 in the cavity 1 for holding an end of the excitation lamp 4, and an O-ring 10 for sealing between the light duct 6 and cavity 1.

Particulars of the rod holder 5 are shown in section in FIG. 2 in an enlarged scale. The rod holder 5 is a hollow cylinder with opposite open ends, one of which is an opening 5a adjacent to the YAG rod 2 and with an inner diameter substantially equal to an outer diameter of the rod 2. The end of the YAG rod 2 is fitted into the opening 5a.

Concentrically fitted into the rod holder 5 is a hollow inner cylinder 11 with opposite open ends and having an inner diameter larger than the outer diameter of the YAG rod 2. The inner cylinder 11 has, at its end adjacent to the YAG rod 2, a flange 11a with an opening whose diameter is substantially equal to the outer diameter of the YAG rod 2. An end face of the flange 11a adjacent to the YAG rod 2 is perpendicular to the axis of the inner cylinder 11. Fitted into a space surrounded by the end face of the flange 11a and a tapered portion 5b of the rod holder 5 is an O-ring 12 which is fitted over an outer periphery of an end of the YAG rod 2 to prevent the cooling water in the channel 7 from leaking into the inner cylinder 11.

Screwed into a thread on an inner surface of the rod holder 5 midway in its longitudinal direction is a pressure ring 13 which has an inner diameter substantially equal to that of the inner cylinder 11. Thus, axial adjustment in a position of the pressure ring 13 allows the O-ring 12 to be pressed with a predetermined pressure axially of the YAG rod 2 via the flange 11a of the inner cylinder 11. Thus, the O-ring 12 is expanded radially of the YAG rod 2 so that the YAG rod 2 is held in a predetermined state radially of the rod holder 5 by a grasping force generated from the expansion of the O-ring 12.

Fitted into the end of rod holder 5 away from the YAG rod 2 is an end of the light duct 6 which has portions respectively with inner diameters substantially equal to and larger than that of the inner cylinder 11. Mounted on an outer periphery of the fitted portion of the light duct 6 to the rod holder 5 is an O-ring 15 which prevents the cooling water in the channels 7 and 8 from leaking into, for example, the hollow spaces of the inner cylinder 11 and light duct 6.

In the above solid state laser apparatus, light is irradiated by the excitation lamp 4 to the YAG rod 2 to generate a laser beam which is output through the hollow spaces in the inner cylinder 11, pressure ring 13, and light duct 6 to the outside of the apparatus. The output laser beam is amplified through its resonation between laser mirrors (not shown) which are installed on axially opposite sides of the YAG rod 2 to sandwich the cavity 1.

To obtain a greater laser output, the above-mentioned solid state laser apparatus must be arranged in a multistage with plural YAG rods 2 aligned with one another. However, in the above-mentioned structure with each YAG rod 2 held by the O-ring 12 made of rubber, it is next to impossible to uniformly pressurize a periphery of a grasped portion of the YAG rod 2, which thereby results in failing to control an eccentricity of the YAG rod 2. Moreover, a centering accuracy of the YAG rod 2 is inherently hard to obtain since manufacturing tolerance of the O-ring 12 is too great in comparison with the required centering accuracy of the YAG rod 2.

Also, irradiation of the light of lamp or LD from the excitation lamp 4 or the returned laser beam to the O-ring 12 may cause the O-ring 12 to deform because of degassing. Moreover, depending upon the material, the O-ring 12 may be hydrolyzed by the cooling water, though it may be resistant to heat. Aging due to such degassing or hydrolysis may also cause the O-ring 12 to deform, resulting in increased eccentricity of the YAG rod 2. The degassing or hydrolysis may also significantly degrade cleanliness of the opposite ends of YAG rod 2, which cleanliness is significant for proper output of the laser beam, resulting in instability and unreliability of the output of the solid state laser apparatus.

In addition, the inner cylinder 11 and pressure ring 13 are required as components which press the O-ring 12 axially of the apparatus to ensure expansion of the O-ring 12 in its radial direction, which leads to structural complication of the components of the apparatus.

SUMMARY OF THE INVENTION

In view of the above, the present invention has as one object to provide a novel solid state laser apparatus that is structurally simple in components but that enables accurate centering of a YAG rod.

A further object of the present invention is to provide a novel solid state laser apparatus which causes neither degassing nor hydrolysis, to thereby improve stability and reliability of the output.

In order to achieve the above object, and overcome the above-mentioned problems in the background art, in one embodiment a solid state laser apparatus according to the invention includes a cavity having a longitudinal hollow with opposite open ends. A cylindrical solid state excitation medium is accommodated in the hollow of the cavity. A solid-state-excitation-medium holder in the form of a hollow cylinder is inserted into each of the opposite open ends of the hollow and is fitted over a corresponding end of the excitation medium. A seal is fitted into a hollow of the holder adjacent to a portion of the holder fitted over the end of the excitation medium. The seal can include an annular seal body with a U-shaped section, made from a resin free of degassing and hydrolysis and fitted over an outer periphery of the end of the excitation medium to grip the excitation medium, as well as a spring fitted into a groove of the seal body provided by the U-shaped section so as to circumferentially surround a gripped portion of the excitation medium. Preferably, the seal body is made from Teflon®.

In the invention, the cylindrical solid state excitation medium can be accurately centered since the gripped portion of the excitation medium is uniformly and circumferentially pressurized through the seal body by the spring. Furthermore, eccentricity of the excitation medium and contamination of the end faces of the same due to aging of the seal body can be prevented since degassing or hydrolysis does not occur in the seal body; as a result, stability and reliability of the output of the apparatus can be improved. Also, the apparatus is structurally simple in components and compact in size since no mechanism is required for pressing the seal axially of the apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

A preferred embodiment of the present invention will be described in detail with reference to FIG. 3.

Figure 3:
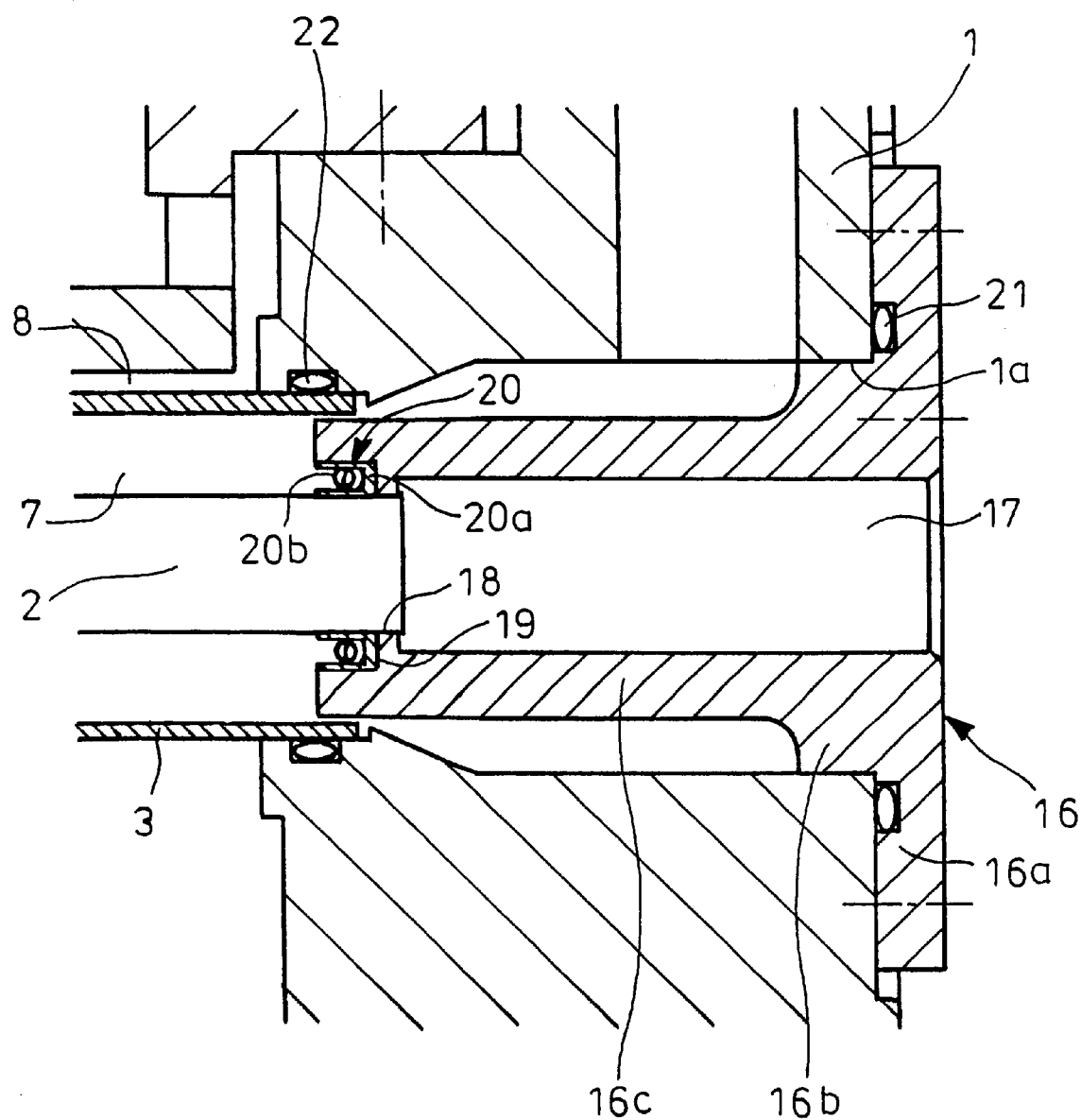
FIG. 3 is an enlarged sectional view of a rod holder which holds a YAG rod in a solid state laser apparatus according to the present invention.

In FIG. 3, a YAG rod 2 is inserted into a cavity 1 such that, as is the case with the background structure, the YAG rod 2 is concentrically in a flow tube 3. Each of axially opposite ends of the YAG rod 2 is held by a rod holder 16 attached to the cavity 1. More specifically, the rod holder 16 includes (1) a larger-diameter flange 16a bolted to an outer surface of the cavity 1, (2) a socket joint 16b which is smaller in diameter than the flange 16a, integral with the flange 16a and fitted into an opening 1a on the cavity 1, and (3) a holder body 16c which is smaller in diameter than the socket joint 16b, integral with the socket joint 16b and inserted into the hollow opening of the cavity 1.

The rod holder 16 also has a bore. The bore includes a hole 17 that is slightly larger in diameter than the outer diameter of the YAG rod 2 and that is used as a light duct, a hole 18 which is contiguous with and nearer to the YAG rod 2 than the hole 17 and into which an end of the YAG rod 2 is fitted, and a hole 19 which is contiguous with and nearer to the YAG rod 2 than the hole 18 and which is larger in diameter than the hole 17.

Fitted into the hole 19 is a seal 20 which includes an annular seal body 20a and a spring 20b. The seal body 20a can preferably be made from Teflon®, has a U-shaped section, and is fitted over an end of the YAG rod 2. The spring 20b is fitted into a groove of the seal body 20a provided by the U-shaped section so as to circumferentially surround and grasp an outer periphery of the YAG rod 2.

In FIG. 3, the solid state laser apparatus also includes a cooling water channel 7 in the flow tube 3 for cooling the YAG rod 2, a cooling water channel 8 in the cavity 1 and outside of the flow tube 3 for cooling an excitation light source (not shown), an O-ring 21 between the flange 16a of the rod holder 16 and the wall of the cavity 1 so as to prevent the cooling water in the channel 7 from leaking outside of the cavity 1, and an O-ring 22 between the hollow of the cavity 1 and an end of the flow tube 3 inserted into the cavity 1 so as to prevent leaking of the cooling water between the channels 7 and 8.

Figure 1:
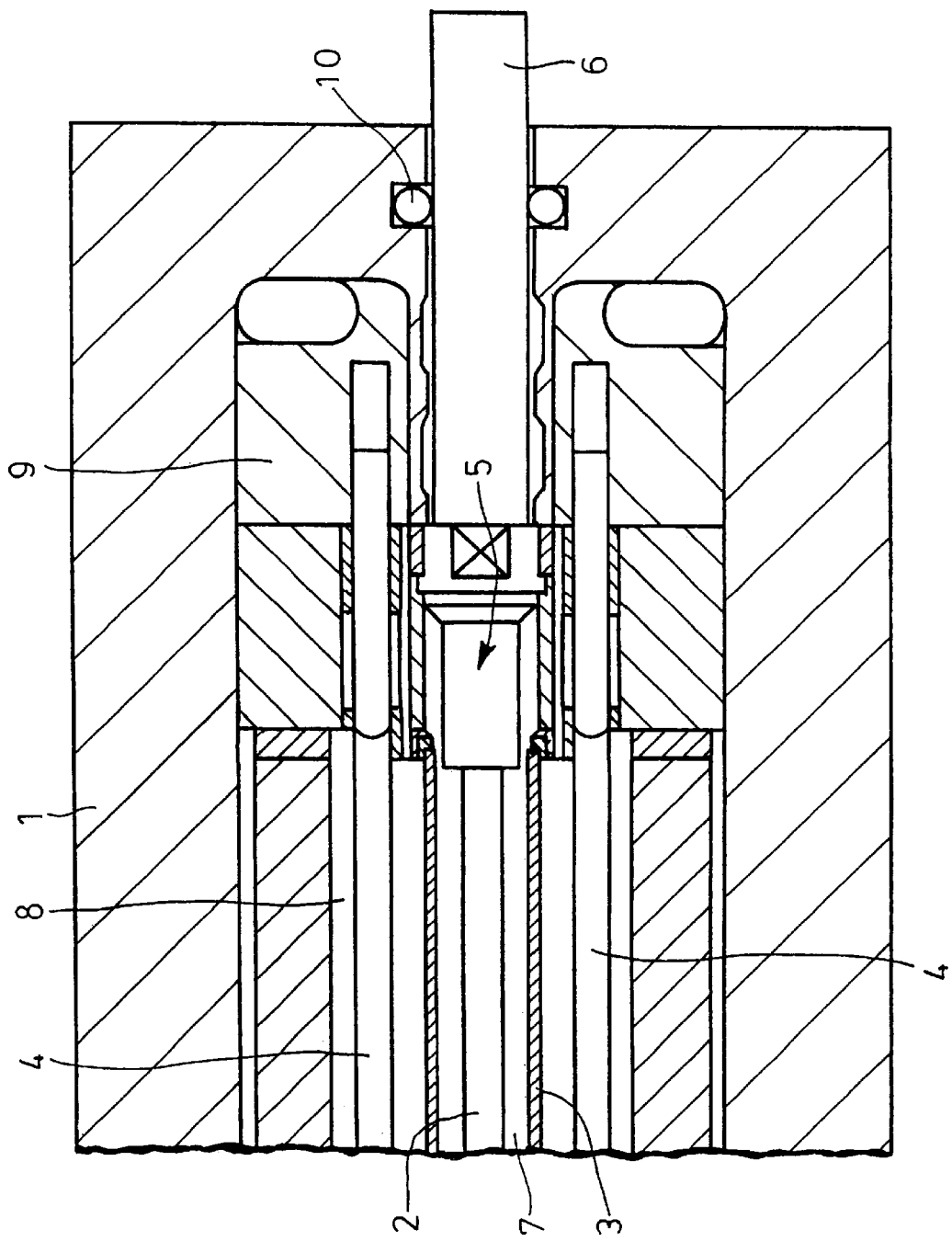
FIG. 1 is a sectional view of an end of a background solid state laser apparatus.
Figure 2:
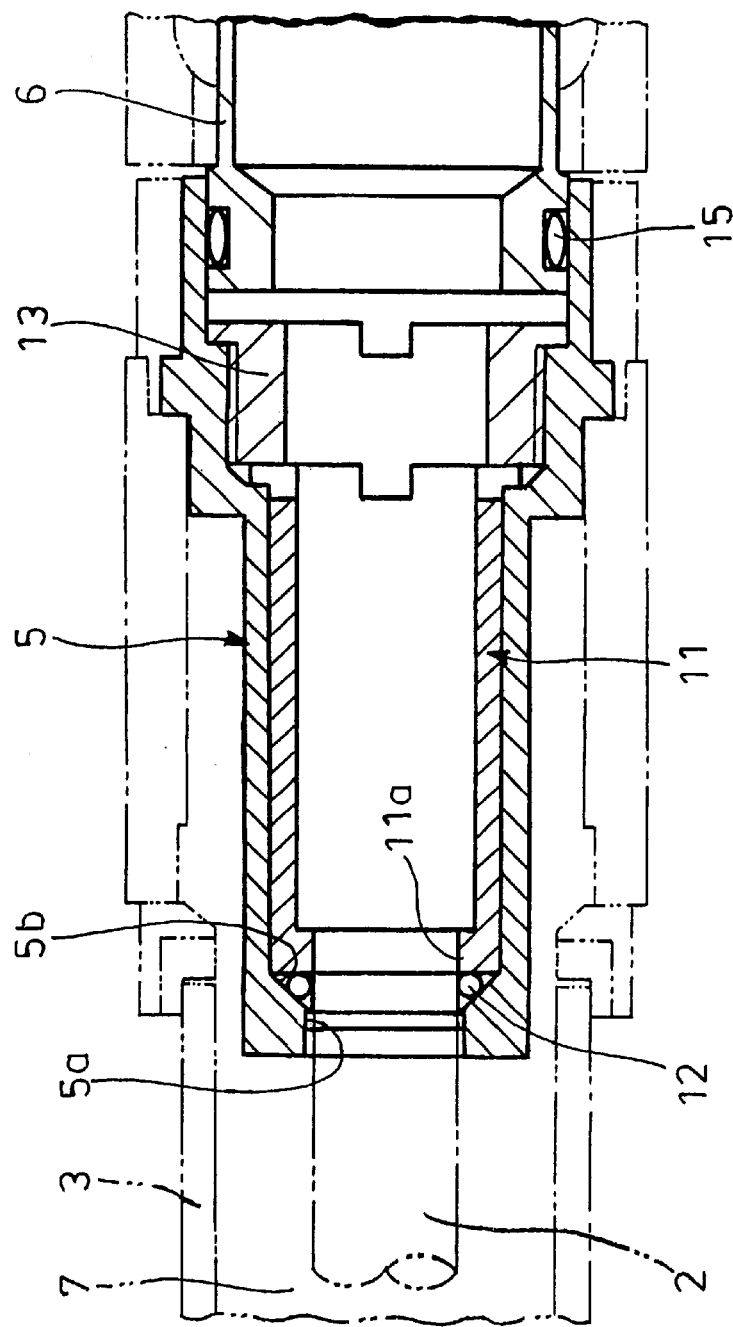
FIG. 2 is an enlarged sectional view of a rod holder which holds a YAG rod in the background solid state laser apparatus of FIG. 1.

The mechanism for laser beam generation in the embodiment is not described since it is the same as that in the background art shown in FIGS. 1 and 2. In the embodiment, an outer periphery of the end of the YAG rod 2 is surrounded and gripped by the spring 20b via the seal body 20a so that the gripped portion of the YAG rod 2 is uniformly pressurized. Thus, eccentricity of the seal 20 is suppressed greater than that of the background O-ring 12. As a result, deviation of centering of the YAG rod 2 is decreased and its installation accuracy is enhanced.

Moreover, irradiation of light of a lamp or an LD as an excitation source or a returned laser beam to the seal body 20a will cause no degassing or aging since the seal body 20a is preferably made from a material such as Teflon®. Therefore, factors for contamination of the ends of the YAG rod 2 and deviation of centering of the YAG rod 2 can be significantly reduced to improve the stability and reliability of an output of the solid state laser apparatus.

In addition, the inner cylinder 11 and pressure ring 13 are not required which are necessary in the background apparatus to press the seal 20 axially of the apparatus, so that the apparatus according to the invention is structurally simple in components and compact in size.

It is to be understood that the prevent invention is not limited to the above-mentioned embodiment and that various changes and modifications may be made without departing from the spirit of the invention. For example, an excitation lamp has been described as the excitation source for the solid state laser apparatus in the embodiment of the invention; however, alternatively, an LD may be used. The solid state excitation medium is also not limited to a YAG rod and any excitation medium may be used if it is a solid cylinder. The resin used in the seal body is not limited to Teflon® and any resin may be used if it can prevent degassing or hydrolysis.

Obviously, numerous additional modifications and variations of the present invention are possible in light of the above teachings. It is therefore to be understood that within the scope of the appended claims, the present invention may be practiced otherwise than as specifically described herein.

What is claimed is:
1. A solid state laser apparatus comprising:
   a cavity with a longitudinal hollow having opposite open ends;
   a cylindrical solid state excitation medium accommodated in the longitudinal hollow of the cavity;
   a solid-state-excitation-medium holder in a form of a hollow cylinder inserted into each of the opposite open ends of the longitudinal hollow and fitted over a corresponding end of the solid state excitation medium;

a seal fitted into a hollow of the solid-state-excitation-medium holder adjacent to a portion of the holder fitted over the end of the solid state excitation medium, the seal including:
- an annular seal body with a U-shaped section, made from a resin free of degassing and hydrolysis, and fitted over an outer periphery of the end of the solid state excitation medium to grip the solid state excitation medium; and
- a spring fitted in a groove of the annular seal body provided by the U-shaped section so as to circumferentially surround a gripped portion of the solid state excitation medium.

2. A solid state laser apparatus according to claim 1, wherein the seal body is made from Teflon®.

3. A solid state laser apparatus according to claim 1, further comprising at least one cooling channel configured to cool the solid state excitation medium.

4. A solid state laser apparatus according to claim 3, further comprising at least one O-ring to prevent leakage of cooling fluid from the cooling channel.

5. A solid state laser apparatus comprising:
- a cavity with a longitudinal hollow having opposite open ends;
- a cylindrical solid state excitation medium accommodated in the longitudinal hollow of the cavity;
- a solid-state-excitation-medium holder in a form of a hollow cylinder inserted into each of the opposite open ends of the longitudinal hollow and fitted over a corresponding end of the solid state excitation medium;
- seal means for fitting into a hollow of the solid-state-excitation-medium holder adjacent to a portion of the holder fitted over the end of the solid state excitation medium, the seal means including:
  - seal body means free of degassing and hydrolysis for fitting over an outer periphery of the end of the solid state excitation medium for gripping the solid state excitation medium; and
  - pressure means for fitting in a groove of the seal body means for circumferentially surrounding a gripped portion of the solid state excitation medium.

6. A solid state laser apparatus according to claim 6, further comprising at least one cooling means for cooling the cylindrical solid state excitation medium.

7. A solid state laser apparatus according to claim 6, further comprising at least one leakage preventing means for preventing leakage of cooling fluid from the cooling means.

8. A solid state laser apparatus according to claim 5, wherein the seal body means is made from Teflon®.

9. A seal for use in a solid state laser apparatus, the solid state laser apparatus including a cavity with a longitudinal hollow having opposite ends, a cylindrical solid state excitation medium accommodated in the longitudinal hollow of the cavity, and a solid-state-excitation-medium holder in a form of a hollow cylinder inserted into each of the opposite ends of the longitudinal hollow and fitted over a corresponding end of the solid state excitation medium, the seal comprising:
- a seal fitted into a hollow of the solid-state-excitation-medium holder adjacent to a portion of the holder fitted over the end of the solid state excitation medium, the seal including:
  - an annular seal body with a U-shaped section, made from a resin free of degassing and hydrolysis, and fitted over an outer periphery of the end of the solid state excitation medium to grip the solid state excitation medium; and
  - a spring fitted in a groove of the annular seal body provided by the U-shaped section so as to circumferentially surround a gripped portion of the solid state excitation medium.

10. A solid state laser apparatus according to claim 9, wherein the seal body is made from Teflon®.

11. Seal means for use in a solid state laser apparatus, the solid state laser apparatus including a cavity with a longitudinal hollow having opposite open ends, a cylindrical solid state excitation medium accommodated in the longitudinal hollow of the cavity, and a solid-state-excitation-medium holder in a form of a hollow cylinder inserted into each of the opposite ends of the longitudinal hollow and fitted over a corresponding end of the solid state excitation medium,
- said seal means for fitting into a hollow of the solid-state-excitation-medium holder adjacent to a portion of the holder fitted over the end of the solid state excitation medium, said seal means including:
  - seal body means free of degassing and hydrolysis and for fitting over an outer periphery of the end of the solid state excitation medium to grip the solid state excitation medium; and
  - pressure means for fitting in a groove of the seal body means for circumferentially surrounding a gripped portion of the solid state excitation medium.

12. A seal means according to claim 11, wherein the seal body means is made from Teflon®.

* * * * *